United States Patent
Du et al.

(10) Patent No.: US 12,464,197 B2
(45) Date of Patent: Nov. 4, 2025

(54) VIDEO PROCESSING METHOD, ELECTRONIC DEVICE AND MEDIUM

(71) Applicant: Douyin Vision Co., Ltd., Beijing (CN)

(72) Inventors: Yuzhang Du, Beijing (CN); Yitao Su, Beijing (CN); Ruie Gao, Beijing (CN); Anya Liu, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 419 days.

(21) Appl. No.: 17/937,236

(22) Filed: Sep. 30, 2022

(65) Prior Publication Data
US 2023/0412891 A1  Dec. 21, 2023

(30) Foreign Application Priority Data
Jun. 20, 2022  (CN) .......................... 202210699370.3

(51) Int. Cl.
*H04N 7/025* (2006.01)
*H04N 21/485* (2011.01)
*H04N 21/488* (2011.01)

(52) U.S. Cl.
CPC ......... *H04N 21/4884* (2013.01); *H04N 7/025* (2013.01); *H04N 21/4856* (2013.01)

(58) Field of Classification Search
CPC .. G10L 15/22; H04N 21/4884; H04N 21/488; H04N 7/025; H04N 7/088; H04N 21/4856; H04N 21/485; H04N 5/50; H04N 5/445; H04N 21/435; H04N 21/4312; H04N 21/431; G11B 27/031; G06F 40/20; G06F 40/30; G06F 40/40
See application file for complete search history.

(56) References Cited

U.S. PATENT DOCUMENTS

| | | | | |
|---|---|---|---|---|
| 4,980,289 | A | * 12/1990 | Temin | C12N 15/86 435/235.1 |
| 5,813,018 | A | * 9/1998 | Kaji | G06T 11/60 715/236 |
| 2020/0043481 | A1 | * 2/2020 | Xiong | H04L 65/75 |

(Continued)

FOREIGN PATENT DOCUMENTS

| CN | 110134973 A | 8/2019 |
|---|---|---|
| CN | 110276349 A | 9/2019 |

(Continued)

OTHER PUBLICATIONS

First Office Action for Chinese Application No. 202210699370.3, mailed on May 27, 2025, 15 pages.

*Primary Examiner* — Huyen X Vo
(74) *Attorney, Agent, or Firm* — Astute IP Law Group

(57) ABSTRACT

Provided are a video processing method, an electronic device and a storage medium. The method includes steps described below. In a process of playing a target video, to-be-converted text in a to-be-processed video frame is determined in response to a triggering operation by a target user on the target video; and the to-be-converted text is converted into translated text of a target language type, and the translated text is presented in a target region in the to-be-processed video frame; where the target region includes a text box region to which the to-be-converted text belongs, or the target region is dynamically determined based on a picture content of the to-be-processed video frame.

16 Claims, 6 Drawing Sheets

(56) References Cited

U.S. PATENT DOCUMENTS

| | | | |
|---|---|---|---|
| 2021/0250660 A1* | 8/2021 | Jiang | G06F 40/166 |
| 2021/0271886 A1* | 9/2021 | Zheng | G06V 20/46 |
| 2022/0350974 A1* | 11/2022 | Etwaru | G06V 30/147 |
| 2023/0102807 A1* | 3/2023 | Rudi | H04N 21/4394 |
| | | | 725/32 |

FOREIGN PATENT DOCUMENTS

| | | |
|---|---|---|
| CN | 110582018 A | 12/2019 |
| CN | 112954441 A | 6/2021 |
| CN | 114327703 A | 4/2022 |
| KR | 20200072616 A | 6/2020 |

* cited by examiner

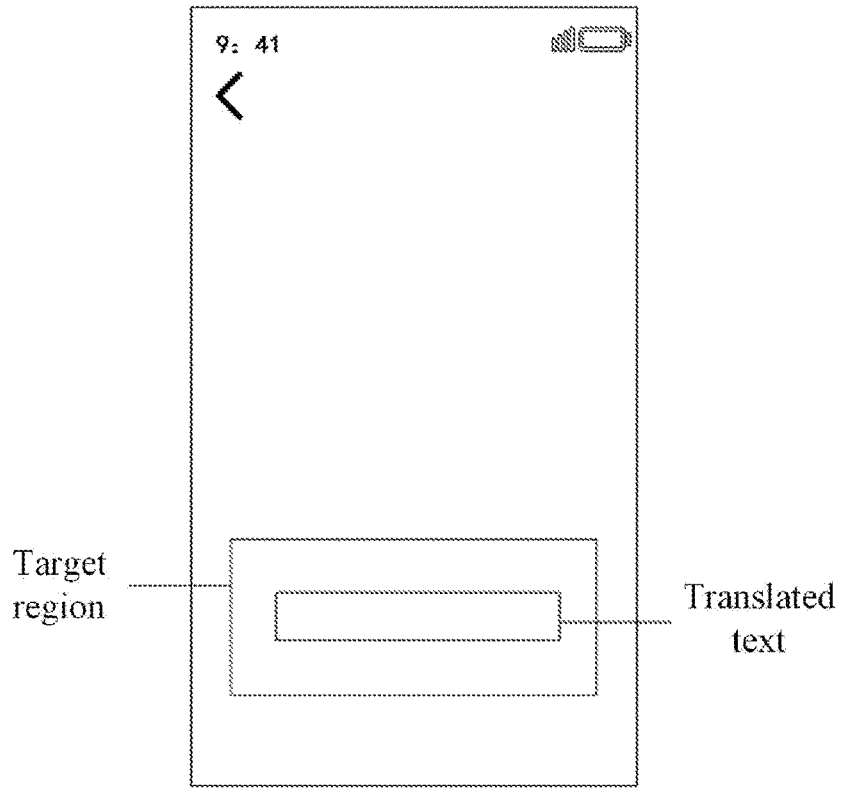

FIG. 7

| In a process of playing a target video, determine to-be-converted text in a to-be-processed video frame in response to a triggering operation by a target user on the target video | S410 |

| Convert the to-be-converted text into translated text of a target language type, determine a display parameter of a target region, and then present the translated text in the target region based on the display parameter | S420 |

FIG. 8

VIDEO PROCESSING METHOD, ELECTRONIC DEVICE AND MEDIUM

CROSS-REFERENCE TO RELATED APPLICATION

This application claims priority to Chinese Patent Application No. 202210699370.3, filed on Jun. 20, 2022, the disclosure of which is incorporated herein by reference in its entirety.

TECHNICAL FIELD

Embodiments of the present disclosure relate to the technical field of video processing and, in particular, to a video processing method and apparatus, an electronic device and a storage medium.

BACKGROUND

At present, many applications provide a corresponding translation function for the user, and the user can translate text information needing to be processed through the translation function.

However, the existing text translation methods often translate the text information during the pause of the video, and when the translated text is presented, the normal watching of the video by the user is often affected, resulting in the poor user experience.

SUMMARY

The present disclosure provides a video processing method and apparatus, an electronic device and a storage medium, so as to present the translation content corresponding to the text in real time during the process of the user watching a video, thereby improving the user experience.

In a first aspect, embodiments of the present disclosure provide a video processing method. The method includes steps described below.

In a process of playing a target video, to-be-converted text in a to-be-processed video frame is determined in response to a triggering operation by a target user on the target video.

The to-be-converted text is converted into translated text of a target language type, and the translated text is presented in a target region in the to-be-processed video frame.

The target region includes a text box region to which the to-be-converted text belongs, or the target region is dynamically determined based on a picture content of the to-be-processed video frame.

In a second aspect, the embodiments of the present disclosure further provide a video processing apparatus. The apparatus includes a to-be-converted text determination module and a translated text presentation module.

The to-be-converted text determination module is configured to, in a process of playing a target video, determine to-be-converted text in a to-be-processed video frame in response to a triggering operation by a target user on the target video.

The translated text presentation module is configured to convert the to-be-converted text into translated text of a target language type, and present the translated text in a target region in the to-be-processed video frame.

The target region includes a text box region to which the to-be-converted text belongs, or the target region is dynamically determined based on a picture content of the to-be-processed video frame.

In a third aspect, the embodiments of the present disclosure further provide an electronic device. The electronic device includes one or more processors and a storage apparatus configured to store one or more programs.

The one or more programs, when executed by the one or more processors, cause the one or more processors to implement any of the video processing methods.

In a fourth aspect, the embodiments of the present disclosure further provide a storage medium including computer-executable instructions which, when executed by a computer processor, configured to implement any of the video processing methods.

According to the technical scheme provided in the embodiments of the present disclosure, in the process of playing the target video, the to-be-converted text in the to-be-processed video frame is determined in response to the triggering operation by the target user on the target video; and the to-be-converted text is converted into the translated text of the target language type, and the translated text is presented in the target region in the to-be-processed video frame, where the target region includes the text box region to which the the to-be-converted text belongs, or the target region is dynamically determined based on the picture content of the to-be-processed video frame. In this manner, the corresponding translated text information is displayed for the user in the process of playing the video based on the triggering operation of the user, so that the user can acquire the corresponding translation information while watching the video; moreover, the translated text information is presented in the corresponding target region, so that the translated information is prevented from affecting the user watching the video, and thus the user experience is improved.

BRIEF DESCRIPTION OF DRAWINGS

The above and other features, advantages, and aspects of embodiments of the present disclosure will become more apparent with reference to the specific implementations hereinafter in conjunction with drawings. The same or similar reference numerals throughout the drawings denote the same or similar elements. It is to be understood that the drawings are illustrative and that originals and elements are not necessarily drawn to scale.

FIG. 7 is a diagram showing a display interface according to an embodiment of the present disclosure;

FIG. 8 is a flowchart of a video processing method according to an embodiment of the present disclosure;

DETAILED DESCRIPTION

Figure 1:
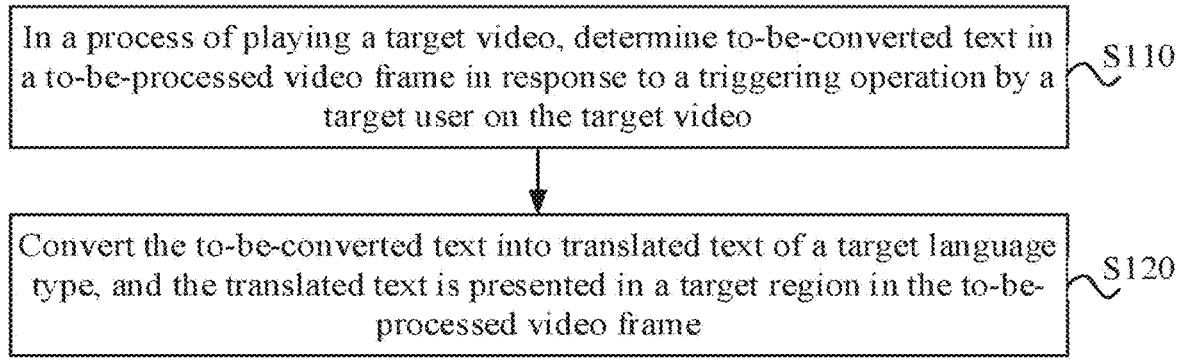
FIG. 1 is a flowchart of a video processing method according to an embodiment of the present disclosure.

Embodiments of the present disclosure are described in more detail hereinafter with reference to the drawings.

Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It is to be understood that the drawings and the embodiments of the present disclosure are illustrative and not intended to limit the scope of the present disclosure.

It is to be understood that various steps recited in the method embodiments of the present disclosure may be performed in a different order, and/or in parallel. In addition, the method embodiments may include additional steps and/or omit execution of illustrated steps. The scope of the present disclosure is not limited in this respect.

The term "includes" used herein means "includes, but is not limited to". The term "based on" used herein means "at least partially based on". The term "an embodiment" used herein means "at least one embodiment". The term "another embodiment" used herein means "at least another embodiment". The term "some embodiments" used herein means "at least some embodiments". Related definitions of other terms are given hereinafter.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that references to modifications of "one" or "a plurality" in the present disclosure are intended to be illustrative and not limiting, and that those skilled in the art should understand that "one" or "a plurality" should be understood as "one or more" unless clearly expressed in the context.

The names of messages or information exchanged between multiple apparatuses in the embodiments of the present disclosure are only for illustrative purposes and are not intended to limit the scope of such messages or information.

It is to be understood that before using technical schemes disclosed in various embodiments of the present disclosure, a user should be notified of the type, scope of use, use scene and the like of personal information involved in the present disclosure and authorization from the user should be acquired in an appropriate manner according to relevant laws and regulations.

For example, in response to receiving an active request from a user, prompt information is sent to the user to explicitly prompt the user that the requested operations will require obtaining and using the personal information of the user. Accordingly, the user can autonomously select according to the prompt information whether to provide personal information for software or hardware, such as an electronic device, an application program, a server or a storage medium, for executing the operations of the technical schemes of the present disclosure.

In an alternative but non-limiting implementation, in response to receiving the active request from the user, the manner in which the prompt information is sent to the user may be, for example, in the form of a pop-up window in which the prompt information may be presented in text. In addition, the pop-up window may also carry a selection control for the user to select "agree" or "disagree" to providing personal information for the electronic device.

It is to be understood that the preceding processes of notifying the user and acquiring the authorization from the user are merely illustrative and do not limit implementations of the present disclosure, and that other manners satisfying relevant laws and regulations may also be applied to the implementations of the present disclosure.

It is to be understood that data (including, but not limited to, the data itself, the acquisition or use of the data) involved in the technical schemes should comply with the requirements of corresponding laws and regulations and relevant provisions.

Before the technical schemes are introduced, application scenes may be described exemplarily. The technical schemes of the present disclosure may be applied to any scene requiring text translation in a video interface. For example, when the display interface includes a text content and the text content needs to be translated into a language type familiar to the user, the text content is translated to acquire the corresponding translated text for displaying. That is, during the video playing process, the translated text may be displayed, so that the text content and the video content can be viewed at the same time. Further, the translated text may be displayed in a target region associated with the text content, so as to avoid the translated text covering the text content and the resulting poor user experience. That is, the corresponding translation information can be obtained correctly without affecting the normal watching experience of the video of the user, and the translated text can be displayed in the corresponding target region to avoid the impact of the translation information on the video content, so that the user experience is improved.

FIG. 1 is a flowchart of a video processing method according to an embodiment of the present disclosure. The embodiment of the present disclosure is applicable to a case of displaying a corresponding translated content to a user in a target display region of a display interface in response to a triggering operation of the user. The method may be executed by a video processing apparatus, the apparatus may be implemented in the form of software and/or hardware and, optionally, by an electronic device, and the electronic device may be a mobile terminal, a person computer (PC) terminal or a server, etc.

As shown in FIG. 1, the method includes steps described below.

In S110, in a process of playing a target video, to-be-converted text in a to-be-processed video frame is determined in response to a triggering operation by a target user on the target video.

The target video may be a video played on a display interface of a terminal device. It is to be noted that the target video may be a video shot and uploaded by a current user or a video uploaded by another user. At this time, the video may include a text content. The target user may be understood as the user currently using the terminal device. The triggering operation may be an operation corresponding to the user triggering a target control on the display interface, or an operation corresponding to a preset behavior performed by the target user. For example, the target control may be a translation control, and the preset behavior may be an "ok" gesture, etc. The triggering operation corresponds to a certain playing moment of the video, and all video frames after the certain playing moment are used as to-be-processed video frames. Of course, if the user triggers the triggering operation and rewinds the video for playing, then the video frame to which the rewinding is performed is also a to-be-processed video frame, that is, video frames played after the triggering operation are used as the to-be-processed video frames. A to-be-processed video frame may include a text content, and this text content may be used as the to-be-converted text. Optionally, the text content may be currently displayed subtitle text or may be text edited in a video creation stage; or, all text information displayed in the to-be-processed video frame may be used as the to-be-converted text. For example, in the process of playing the target video, if the target user triggers the target control or triggers a preset behavior, it is indicated that the text content in the target video needs to be translated, and the text content may be used as the to-be-converted text.

It is to be noted that in the process of playing the target video, even if the corresponding triggering operation is triggered, the video is continuously played while the translated text is displayed, so that the video playing and the translated text displaying are synchronously achieved, and the problem in the related art is solved of the poor video watching experience caused by that the current video frame is paused to display the translated text after the target control is triggered.

In the embodiment, the triggering operation includes at least one of: triggering a text translation control on a display interface; triggering at least one of a text box or the to-be-converted text in the to-be-processed video frame; detecting that audio information triggers a translation wake-up word; or detecting a long press on the to-be-processed video frame.

The text translation control is a control for triggering text content translation. Optionally, an icon of the translation function may be displayed on the display interface; when the icon of the translation function is triggered, it is indicated that the to-be-converted text needs to be translated. The text box may be a text container or a graphics container. The audio information may be understood as audio information obtained after a speech signal emitted by the target user is recognized.

It is to be noted that multiple triggering manners exist for the text translation function provided in the embodiment of the present disclosure, and a user may select different triggering manners according to requirements to execute the text translation function, and different triggering schemes provided in the embodiment of the present disclosure are sequentially described.

In a first manner, the language type of the text content is generally associated with the language type used by the creator; if the displayed text content cannot be read normally, or if the text content needs to be converted into translated text of a certain language type, the translation control on the display interface may be triggered to translate the text content.

In a second manner, in the process of playing the target video, if text needs to be translated, the text box in the current to-be-processed video frame or text information displayed in the text box may be triggered, and when the preceding information is triggered, it is indicated that the translation function is triggered.

In a third manner, in the process of playing the target video, if it is desired to view the translated text, corresponding language information may be sent out, the language information is collected based on a microphone array on the terminal device, and the intent corresponding to the language information is recognized. If the intent corresponding to the language information corresponds to the translation intent, it is indicated that the translation function is triggered.

In a fourth manner, in the process of playing the video, if a long press is performed on the display interface, it is indicated that the text translation function is triggered. Exemplarily, the duration threshold of the long press is 5 s; if the user presses the to-be-processed video frame for a time longer than or equal to 5 s, it can be considered that the user needs to start the text translation function, and subsequent operations can be performed at this time.

It is to be noted that the to-be-processed video frame may include a text box or may not include a text box. To process the text content displayed in the to-be-processed video frame in a timely and efficient manner, whether the video frame includes a text box may be determined based on a presentation attribute associated with the target video, and the to-be-converted text in the text box is further acquired.

Optionally, the step in which the to-be-converted text in the to-be-processed video frame is determined may refer to the step described below. In response to determining that a to-be-processed video frame includes a text box based on a presentation attribute associated with the target video, to-be-displayed text in the text box is acquired as the to-be-converted text. The presentation attribute includes a presentation position and a presentation timestamp. The presentation attribute may be a relevant attribute value of the target video, for example, may be an attribute such as the video duration of the target video, the definition of the target video, the timestamp of the to-be-converted text in the video, and the presentation position of a text box to which the to-be-converted text belongs in the video frame. The presentation position may be understood as the presentation position of the text box in the to-be-processed video frame, and the corresponding presentation timestamp may be understood as the time data of the text box in the target video.

For example, the presentation attribute associated with the target video may be detected; if the timestamp corresponding to the to-be-converted text in the presentation attribute includes the timestamp corresponding to the to-be-processed video frame, it is indicated that the to-be-processed video frame includes the text box, and at this time, the presentation position of the text box may be determined based on the presentation position in the presentation attribute, and the to-be-converted text in the text box may be acquired. In the preceding manner for determining the to-be-converted text, the convenience of determining the to-be-converted text is improved.

In S120, the to-be-converted text is converted into translated text of a target language type, and the translated text is presented in a target region in the to-be-processed video frame.

The target region includes a text box region to which converted text content belongs, that is, a text box region set by the user when the user uploads the video is used as the target region. In this manner, when creating a video, the user generally arrange the text box in a suitable region to avoid blocking the video content, that is, the text box will not block the video content to a great extent. Therefore, accordingly, when the text box region is used as the target region, the video content will not be blocked. Alternatively, the target region is dynamically determined based on a picture content of the to-be-processed video frame. That is, to further avoid the situation where the translated text blocks the video content, the target region may be dynamically determined according to the video content, so as to achieve the effect of avoiding the translated text blocking the target region. The target language type may be the language type to which conversion is required. The translated text may be understood as the text resulting from the translation of the to-be-converted text.

For example, the to-be-converted text may be converted into the translated text of the target language type and presented in the target region in the to-be-processed video frame. For example, the target language type is Chinese, the language type of the to-be-converted text is English, after the translation function is triggered, the to-be-converted text may be translated from English to Chinese, and the translated text is presented in the target region in the to-be-processed video frame.

It is to be noted that the meaning of the to-be-converted text is the same as the meaning of the translated text. To ensure that the user can correctly obtain the meaning of the to-be-converted text, it is necessary to ensure the meaning of the translated text to be the same as the meaning of the to-be-converted text as much as possible in the process of text translation.

In practical applications, the target language type may be set by default in the development stage, dynamically selected according to the actual requirements of the user, or automatically determined according to the relevant information of the user. Optionally, the target language type is determined in at least one of manners described below. The target language type is determined according to geographical position information of a terminal device to which the target video belongs; at least one to-be-selected language type pops up in response to the triggering operation, and a to-be-selected language type triggered and selected is used as the target language type; the target language type is determined according to a language type of a play history within a preset time period; a preset default language type is used as the target language type; or a language type set by a terminal device is used as the target language type.

The geographical position information may be the information of a region to which the terminal device belongs. For example, the information of the region to which the current terminal device belongs may be determined through a positioning function in the terminal device. The language type used in the region may be determined based on the information of the region and is used as the target language type. The to-be-selected language type may be a selectable language type provided for the user, for example, may be English, Chinese, Spanish, French, etc. The play history may be a record of historically watched videos of the user. The default language type may be understood as a language type preset by the user.

It is to be noted that the embodiment of the present disclosure provides various manners for determining the target language type, so that different manners for determining the target language type according to the requirements of the user can be provided, and thereby the requirements of the user can be satisfied as much as possible. The specific manners are described below.

In a first manner, when the user triggers the text translation function, a positioning module of the terminal device may be called by an application program to determine the current geographical position information of the terminal device based on the positioning module. The language type used at the geographical position indicated by the current geographical position information is used as the target language type. For example, if the current geographical position information indicates the geographical position is A and the language type used at A is Chinese, Chinese may be used as the target language type.

In a second manner, after the control corresponding to the text translation function is triggered, a list of to-be-elected language types may pop up on the current display interface, the user may trigger and select a language type to which the translation needs to be performed from the list, and the language type selected is used as the target language type.

In a third manner, in a case where a user permission is allowing to obtain the information of watching history, after the translation control is triggered, the language type used by a historically associated video may be acquired and used as the target language type. For example, the language type of the last video watched by the user may be used as the target language type. Alternatively, the language type to which the last time of translation is performed is used as the target language type. For example, after the translation function control is triggered last time, the selected language type is used as the target language type of this time of translation. Alternatively, language types corresponding to videos watched by the user within a preset time period or language types selected when the translation function is triggered within a preset time period are counted, frequencies corresponding to various language types are determined separately, and the language type having the highest frequency is used as the target language type.

In a fourth manner, when the user installs an application program for the first time, a language type selection interface may pop up, and the selected language type is used as the default language type of the application program; therefore, after the user triggers the text translation function, the default language type corresponding to the application program is directly used as the target language type.

In a fifth manner, when the terminal device is activated for the first time, a corresponding language type selection interface may pop up, and the selected language type is used as the default language type of the terminal device; therefore, after the user triggers the text translation function, the default language type is directly used as the target language type.

According to the technical scheme provided in the embodiment of the present disclosure, in the process of playing the target video, the to-be-converted text in the to-be-processed video frame is determined in response to the triggering operation by the target user on the target video; and the to-be-converted text is converted into the translated text of the target language type, and the translated text is presented in the target region in the to-be-processed video frame, where the target region includes the text box region to which the converted text content belongs, or the target region is dynamically determined based on the picture content of the to-be-processed video frame. In this manner, the corresponding translated text information is displayed for the user in the process of playing the video based on the triggering operation of the user, so that the user can acquire the corresponding translation information while watching the video; moreover, the translated text information is presented in the corresponding target region, so that the translated information is prevented from affecting the user watching the video, and thus the user experience is improved.

Figure 2:
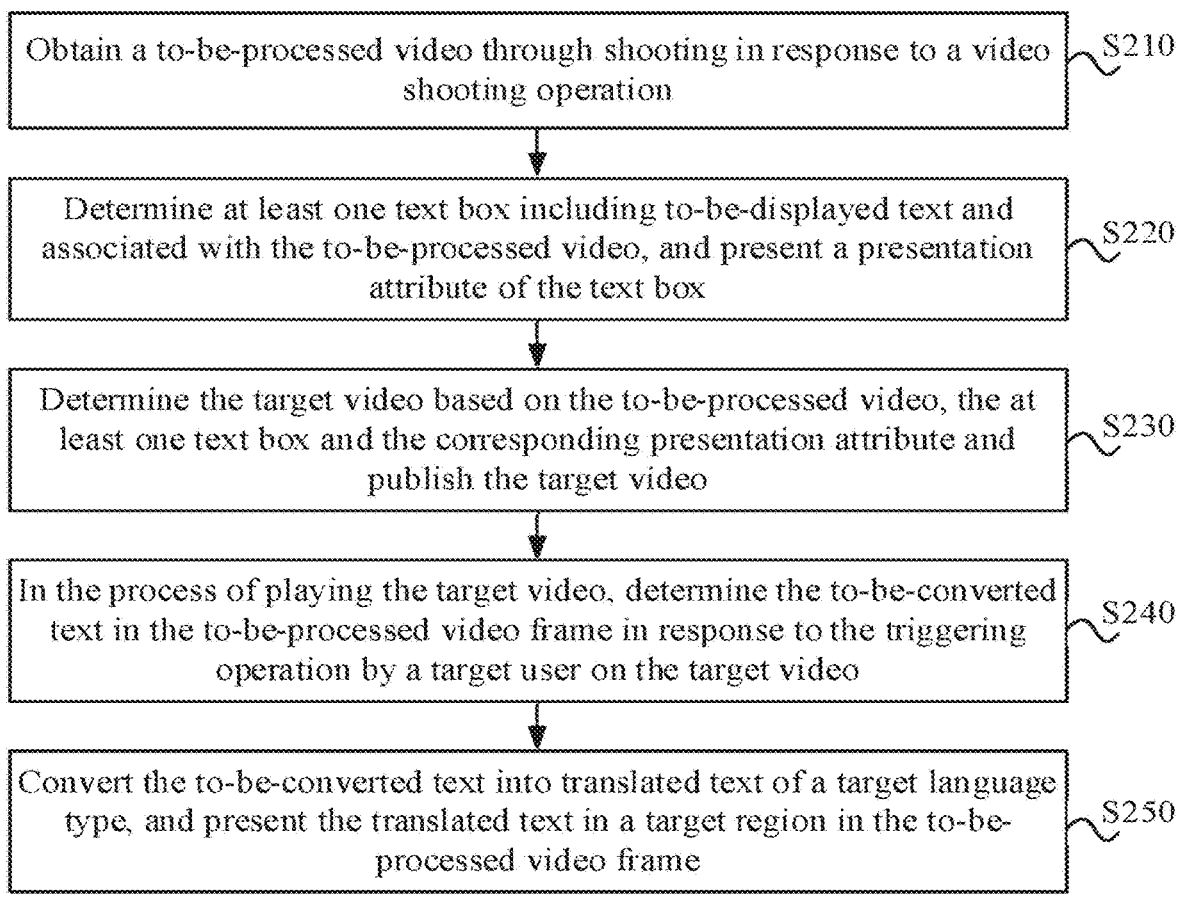
FIG. 2 is a flowchart of a video processing method according to an embodiment of the present disclosure.

FIG. 2 is a flowchart of a video processing method according to an embodiment of the present disclosure. Based on the preceding embodiment, the user may create a video first and upload the video for playing, so as to obtain the translated text corresponding to the to-be-converted text in the process of playing the video. For the specification implementation, reference may be made to the technical scheme of the embodiment. Technical terms identical to or corresponding to the preceding embodiment are not repeated.

As shown in FIG. 2, the method includes steps described below.

In S210, a to-be-processed video is obtained through shooting in response to a video shooting operation.

An operation corresponding to triggering a video shooting control is taken as the video shooting operation. The to-be-processed video may be understood as a video obtained through shooting in response to the video shooting operation. That is, the to-be-processed video may be a video shot by a user independently, or a video created independently. For example, multiple images may be uploaded and laid out to obtain the to-be-processed video.

In S220, at least one text box including to-be-displayed text and associated with the to-be-processed video is determined, and a presentation attribute of the text box is presented.

The to-be-displayed text may be text that needs to be displayed. That is, the text edited in the process of creating the video is used as the to-be-displayed text. In the process of playing the video, the displayed text is used as to-be-converted text. It is to be noted that the content and substantive meaning of the to-be-displayed text are the same as the content and substantive meaning of the to-be-converted text, except that the text is named differently at different stages.

For example, after the to-be-processed video is obtained, a text box may be added to each video frame in the to-be-processed video and a corresponding text content may be edited in the text box. That is, the presentation attribute corresponding to the text box is set, so that in the subsequent process of playing the video, the to-be-converted text in a to-be-processed video frame may be determined according to the presentation attribute.

Based on the preceding technical scheme, the presentation attribute includes a presentation timestamp and a presentation position, and the step in which the at least one text box including the to-be-displayed text and associated with the to-be-processed video is determined, and the presentation attribute of the text box is presented includes steps described below. In response to detecting triggering a text editing control, a to-be-edited text box is displayed for editing a to-be-played text content in the to-be-edited text box; a display timestamp of the at least one text box in the to-be-processed video is adjusted based on a triggering operation on a presentation time control to present the to-be-displayed text based on the presentation timestamp in the process of playing a target video; and a presentation position of the at least one text box in the corresponding to-be-processed video frame is determined based on a dragging operation on the at least one text box to present the to-be-displayed text based on the presentation position in the process of playing the target video.

The text editing control may be a control for initiating a text editing function. The to-be-edited text box is understood as a blank text box for which text editing has not been completed. The to-be-played text content may be text information input by the user. The presentation time control may be understood as a control for setting a presentation time function. The dragging operation may be an operation that the user dragging the text box. The presentation position may be understood as the presentation position of the text box in the to-be-processed video frame.

Figure 3:
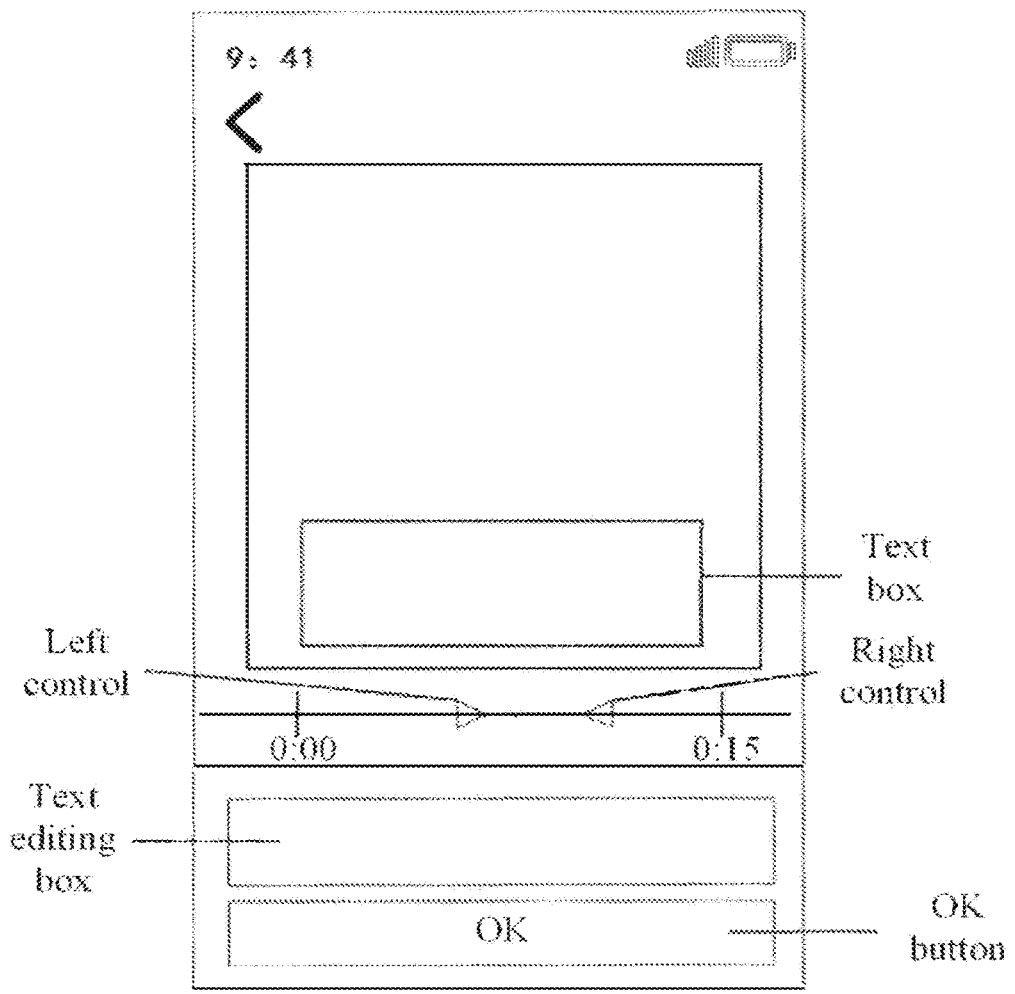
FIG. 3 is a diagram showing a text box editing function according to an embodiment of the present disclosure.

For example, when the user triggers the text editing control, the to-be-edited text box is displayed on the display interface, the user may drag position information of the to-be-edited text box on the display interface, and further, text information needing to be displayed may be input into the to-be-edited text box and used as a to-be-displayed text content. After text information editing is completed, the presentation time control may be triggered to set the presentation timestamp of the text box. As shown in FIG. 3, the user may set the presentation time of the text box by adjusting the time progress bar of the to-be-processed video. For example, if the user needs to present the text box at 0:07 to 0:10 of the to-be-processed video, a left control on the progress bar may be placed at 0:07, and a right control may be placed at 0:10; further, the user may adjust the position of the text box when the text box is presented by dragging the text box, and the adjusted position is used as the presentation position. After the setting is completed, an OK button may be clicked on to get the presentation attribute of a text box to which the to-be-displayed text belongs.

In S230, the target video is determined based on the to-be-processed video, the at least one text box and the corresponding presentation attribute and is published.

For example, the to-be-displayed text may be presented at the corresponding position of the to-be-processed video according to the at least one text box which is set and the corresponding presentation attribute to obtain the final target video. It is to be understood that the target video may be understood as a video content obtained after the text box set by the user and the to-be-processed video are fused, and the obtained target video is published.

In S240, in the process of playing the target video, the to-be-converted text in the to-be-processed video frame is determined in response to the triggering operation by a target user on the target video.

In S250, the to-be-converted text is converted into translated text of a target language type, and the translated text is presented in a target region in the to-be-processed video frame.

According to the technical scheme of the embodiment of the present disclosure, the to-be-processed video is obtained through shooting in response to the video shooting operation; the at least one text box including the to-be-displayed text and associated with the to-be-processed video is determined, and the presentation attribute of the text box is presented; and the target video is determined based on the to-be-processed video, the at least one text box and the corresponding presentation attribute and is published. In this manner, the presentation attribute of the text box can be set by the user, which improves the convenience for the user to set the information of the to-be-presented text and thereby improves the user experience.

Figure 4:
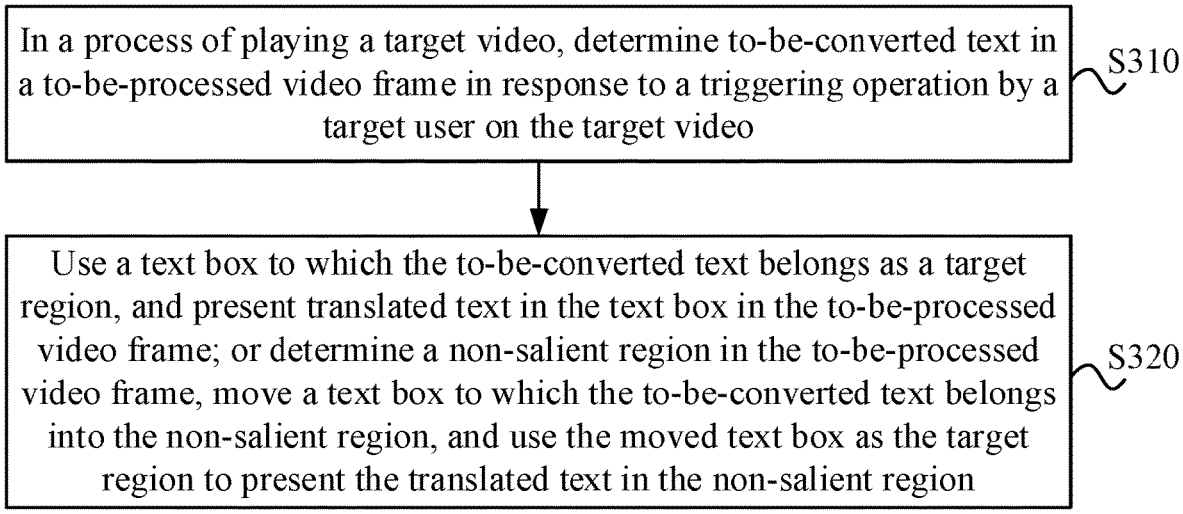
FIG. 4 is a flowchart of a video processing method according to an embodiment of the present disclosure.

FIG. 4 is a flowchart of a video processing method according to an embodiment of the present disclosure. Based on the preceding embodiments, the step in which the to-be-converted text is converted into the translated text of the target language type, and the translated text is presented in the target region in the to-be-processed video frame may be further specified. For the specific implementation, reference may be made to the technical scheme of the embodiment. Technical terms identical to or corresponding to the preceding embodiments are not repeated here.

In S310, in a process of playing a target video, to-be-converted text in a to-be-processed video frame is determined in response to a triggering operation by a target user on the target video.

In S320, a text box to which the to-be-converted text belongs is used as a target region, and translated text is presented in the text box in the to-be-processed video frame; or a non-salient region in the to-be-processed video frame is determined, a text box to which the to-be-converted text belongs is moved into the non-salient region, and the moved text box is used as the target region to present the translated text in the non-salient region.

The non-salient region is a region having low visual salience in the to-be-processed video frame. It is to be understood that for the content in the to-be-processed video frame, some regions are more salient than other parts and are more capable of attracting the attention of viewers, the degree of which may be measured by visual salience. The high visual salience of a region means that the region is more capable of attracting the attention of viewers, and accordingly, it may also be understood as that the region having high visual salience represents the main content of the to-be-processed video frame.

For example, the text box to which the to-be-converted text belongs may be directly used as the target region, and the obtained translated text is directly presented in the text box of the to-be-processed video frame; or the non-salient region in the to-be-processed video frame is determined, after the text box is moved into the non-salient region, the moved text box is used as the target region, and the translated text is displayed in the non-salient region.

Figure 5:
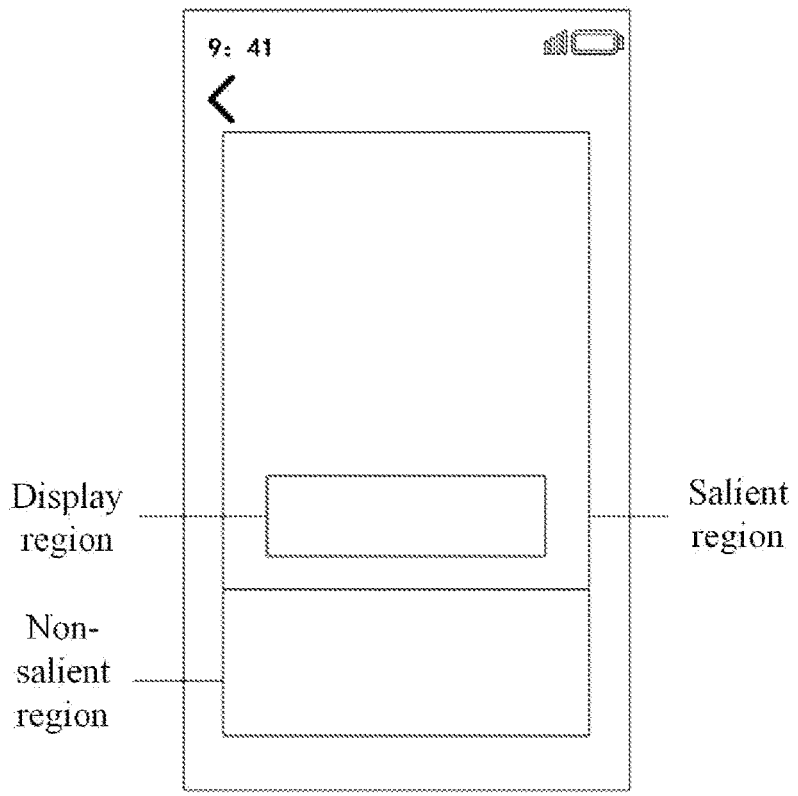
FIG. 5 is a diagram showing a display interface according to an embodiment of the present disclosure.
Figure 6:
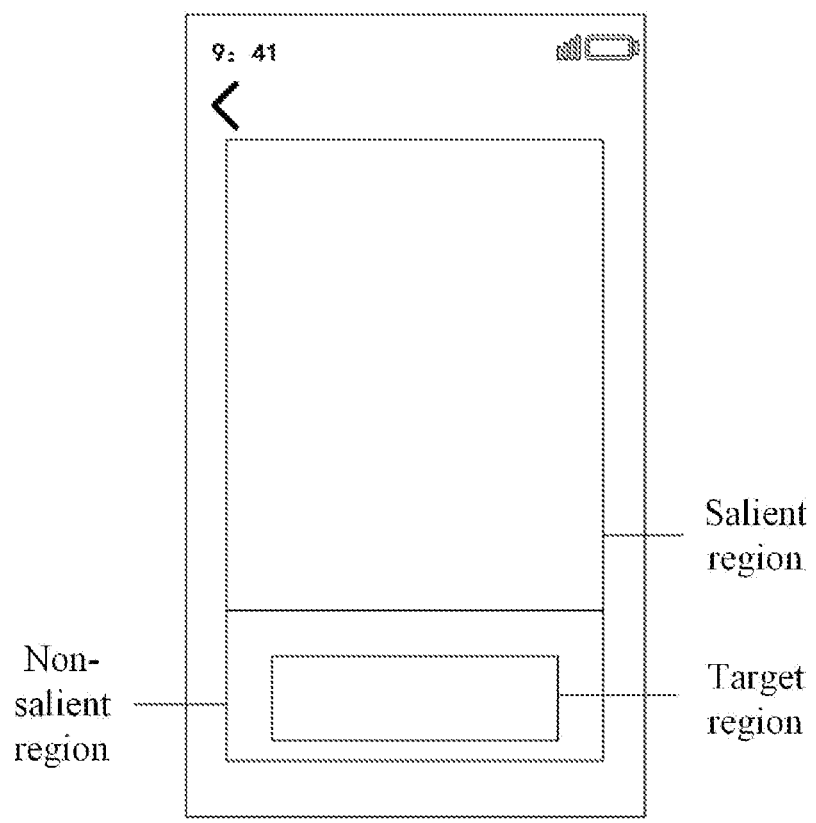
FIG. 6 is a diagram showing a display interface according to an embodiment of the present disclosure.

Exemplarily, as shown in FIG. 5, the display region of the to-be-converted text is displayed in the position of a salient region of the to-be-processed video frame, affecting the watching of the video by the user. To avoid the display region of the to-be-converted text blocking the content of the video, a preset machine learning algorithm may be used for recognizing the to-be-processed video frame, then the salient region and the non-salient region of the to-be-processed video frame are determined, the text box is moved into the non-salient region, and the moved text box is used as the target region so that the translated text is displayed in the target region, as shown in FIG. 6.

Based on the technical scheme, the step in which the translated text is presented in the target region in the to-be-processed video frame includes the step described below. The translated text is presented in the target region in the to-be-processed video frame according to the font size corresponding to the to-be-converted text or a default font size.

The font size is used for characterizing the size of a font, and accordingly, the default font size is a font size preset for displaying the translated text in the target region. For example, the translated text may be displayed according to the font size used by the to-be-converted text, or the translated text may be displayed in the default font size preset for the translated text. The advantage of setting the default font size is that different default font sizes may be set for different target language types to achieve the fast matching of the translated text to the target region.

Exemplarily, the corresponding default font size information may be determined according to the terminal device used by the user. For example, for Chinese characters, the default font size may be set to size 24, that is, the default font size of the translated text obtained based on the translation function is size 24.

In practical applications, the case may exist where the translated text does not match the target region, for example, the area of the region occupied by the translated text is greater than the area of the target region, or the area of region occupied by the translated text is less than the area of the target region. To solve the preceding problem, the translated text or the target region may be processed, and for the specific implementation, reference may be made to the detail description below.

Optionally, the translated text and/or the target region are processed according to the occupied region area of the translated text and the region area of the target region so that the translated text matches the target region.

The occupied region area may be understood as the occupied area of the translated text on the display interface.

For example, after the region area occupied by the translated text is acquired, the relationship between the region area occupied by the translated text and the region area of the target region can be determined, and thus the translated text and/or the target region can be processed so that the translated text matches the target region. It is to be understood that the length of the translated text corresponding to different target language types is different. If the region area occupied by the obtained translated text is greater than the area of the target region, the translated text cannot be fully displayed in the target region, and therefore the target region and/or the translated text need to be processed so that the translated text can match the target region.

In the embodiment, the step in which the translated text is processed so that the translated text matches the target region includes the step described blow. In a case where the occupied region area of the translated text is greater than the region area of the target region, the font size of the translated text is sequentially adjusted under a condition that the region area of the target region does not change so that the translated text matches the target region.

For example, in the practical applications, if the current occupied region area of the translated text is greater than the region area of the target region, the font size of the translated text may be sequentially adjusted under the condition that the region area of the target region does not change so that the region area occupied by the translated text matches the region area of the target region.

Exemplarily, if the font size of the translated text corresponds to the initial font size of the to-be-converted text, for example, if the font size of the translated text and the font size of the to-be-converted text are both size four, and the current region area occupied by the translated text is greater than the region area of the target region, the font size of the translated text needs to be reduced sequentially based on size four. For example, the font size may be adjusted from size four to size minus four; if the region area of the translated text still does not match the region area of the target region, the font size may be further adjusted to size five; and if the region area of the translated text still does not match the region area of the target region, the font size of the translated text is sequentially adjusted.

In the practical applications, to enable the user to quickly acquire the translated text information, the font size of the translated text is often set to match the interface of the terminal device used by the user. That is, if the font size of the translated text is too small, the watching experience of the user will be reduced; therefore, a corresponding font size threshold may be set according to the size of the interface of the terminal device used by the user, and when the font size threshold is reached, the font size of the translated text will not be adjusted, that is, if the font size of the translated text reaches the font size threshold, the font size of the translated text will not be adjusted. For example, if the terminal device used by the user is a mobile phone, the minimum font size threshold of the translated text may be set to size 10, and when size 10 is reached, the font size of the translated text will not be adjusted.

If only the translated text is adjusted and the obtained display effect still cannot satisfy the requirements of the user, the target region needs to be further adjusted so that the adjusted display effect can satisfy the requirements of the user. Therefore, optionally, the step in which the target region is processed so that the translated text matches the target region includes the step described below. The region area of the target region is enlarged according to a preset adjustment rule so that the translated text matches the target region.

The preset adjustment rule includes horizontally enlarging the text box by a first preset size and, in response to the enlarged text box not matching the target region, then longitudinally enlarging the enlarged text box by a second preset size, or longitudinally enlarging the text box by a first preset size and, in response to the enlarged text box not matching the target region, then horizontally enlarging the enlarged text box by a second preset size, or dynamically enlarging the horizontal size of the text box and/or the longitudinal size of the text box based on the non-salient region in the to-be-processed video frame. The first preset size and the second preset size may be preset pixel size information for adjusting the text box. For example, the first preset size and the second preset size may be set to 10 pixels, and a corresponding adjustment frequency, for example, 15 times, is set; when the number of adjustments reaches 15 times, the adjustment of the target region is stopped.

To clearly introduce the technical scheme, the description may be made in a case where the first preset size and the second preset size are 150 pixels. For example, when the occupied region area of the translated text does not match the area of the target region, the region area occupied by the translated text may be kept unchanged and the area of the target region is adjusted so that the adjusted target region matches the translated text. For example, when the occupied region area of the translated text is greater than the area of the target region, the text box may be firstly horizontally enlarged by 150 pixels, and if the enlarged text box does not match the translated text, the text box is then longitudinally enlarged by 150 pixels; or the text box may be firstly longitudinally enlarged by 150 pixels, and then be horizontally enlarged by 150 pixels; or the non-salient region in the to-be-processed video frame may be recognized through a preset method, and the size information of the text box is dynamically adjusted according to the size of the non-salient region so that the adjusted target region matches the translated text.

Exemplarily, if after the font size of the translated text is adjusted, the adjusted translated text still cannot match the target region, the target region may be enlarged so that the target region matches the translated text. For example, the target region may be firstly horizontally enlarged by 150 pixels, and then whether the horizontally enlarged target region can match the translated text is checked; if the horizontally enlarged target region cannot match the translated text, the target region is continuously longitudinally enlarged by 150 pixels, and then whether the enlarged target region can match the translated text is checked; if the horizontally enlarged target region still cannot match the translated text, the target region is continuously processed through the preceding method until the obtained target region matches the translated text.

Based on the preceding technical scheme, the step in which the translated text is presented in the target region in the to-be-processed video frame includes the step described below. In a case where the occupied region area of the translated text is less than the region area of the target region, the display size of the text box on the display interface is reduced so that the translated text matches the target region for display.

For example, in the practical applications, the case may exist where the region area occupied by the translated text is much less than the region area of the target region. To avoid the impact of the excessive large blank area on the watching by the user, the display size of the text box on the display interface may be reduced so that the translated text matches the target region. Exemplarily, as shown in FIG. 7, when the area occupied by the translated text obtained by translation is much less than the area of the text box, the size of the text box may be adjusted. For example, the size of the region occupied by the translated text may be recognized by an image recognition algorithm, and the size of the text box is directly adjusted to match the size of the translated text.

According to the technical scheme provided in the embodiment of the present disclosure, the translated text and/or the target region are processed when the region area occupied by the translated text does not match the region area of the target region so that the translated text matches the target region after the processing. In this manner, it is ensured that the corresponding translated text can be completely acquired in the target region, and thus the user experience is improved.

FIG. 8 is a flowchart of a video processing method according to an embodiment of the present disclosure. Based on the preceding embodiments, the specific process that the to-be-converted text is converted into the translated text of the target language type, and the translated text is presented in the target region in the to-be-processed video frame is further specified. For the specific implementation, reference may be made to the technical scheme of the embodiment. Technical terms identical to or corresponding to the preceding embodiments are not repeated here.

In S410, in a process of playing a target video, to-be-converted text in a to-be-processed video frame is determined in response to a triggering operation by a target user on the target video.

In S420, the to-be-converted text is converted into translated text of a target language type, a display parameter of a target region is determined, and then the translated text is presented in the target region based on the display parameter.

In the embodiment, the display parameter may be determined in at least two manners.

In a first manner, the display parameter of the target region is determined according to a transparency parameter set when a to-be-processed video is created. For example, when a user creates a to-be-processed video, the user may set a transparency parameter of a text box based on a transparency parameter setting page corresponding to the text box, and the user may further set the background color of the text box.

Optionally, the display parameter of the target region in a case where the translated text is presented is determined according to the transparency parameter of the text box in the to-be-processed video frame.

The display parameter includes display transparency and a display color. The transparency parameter may refer to the visibility of the background color of the text box set by the user when the user adds text information. The display color may be understood as the background color of the text box.

For example, the display parameter of the target region in the case where the translated text is presented is determined based on the transparency parameter of the text box set by the user when the user adds the text information, and then the target region is processed based on the display parameter. For example, when adding the text information, the user may freely set the background color and the transparency of the text box according to the requirements. When the user needs that the background color of the text box does not affect the watching of the video, the transparency of the text box may be set to 100, that is, the text box is completely transparent, and no background color exists; when the user needs to emphasize the added text information, the background color of the text box may be set to red and the transparency to 0, that is, the text box is completely opaque.

Exemplarily, the presentation method of the target region may be determined according to the transparency parameter set by the user. For example, if the background parameter set by the user is opaque, the target region continues to be set to opaque and the background color set by the user is followed; if the transparency parameter set by the user is semi-transparent or transparent, the translated text may be presented in a default presentation manner; for example, the background color of the target region is set to white and the transparency is set to 90.

According to the technical scheme provided in the embodiment of the present disclosure, to ensure that the translated text and the presentation method of the translated text satisfy the requirements of the user, the display parameter of the target region may be processed so that the processed target region satisfy the presentation requirements of the user.

In a second implementation manner, the display parameter of the target region is dynamically determined based on a video content. Optionally, the manner may include steps described below.

In step one, an edge line of the target region is acquired.

The edge line may be understood as a border line of the target region.

For example, after the target region is determined, the border line of the target region may be determined by recognizing the to-be-processed video frame through an image recognition algorithm; or the border line of the target region may be determined according to parameter information generated in the process of determining the target region.

In step two, for at least one to-be-processed pixel point on the edge line, at least one to-be-fused pixel point within a preset neighborhood range of a current to-be-processed pixel point is acquired, and a to-be-processed pixel attribute of the current to-be-processed pixel point is determined according to a pixel attribute of the at least one to-be-fused pixel point.

All pixel points on the edge line are used as to-be-processed pixel points. The preset neighborhood range may be a neighborhood formed by taking a to-be-processed pixel point as a center and taking a preset number of pixels as a radius. Accordingly, a pixel point in a preset neighborhood is used as a to-be-fused pixel point. It is to be noted that a corresponding preset neighborhood exists for each to-be-processed pixel point, and one to-be-processed pixel point is used as an example in the embodiment. The to-be-processed pixel attribute may be a color value corresponding to the to-be-processed pixel point.

After the pixel attribute of the to-be-processed pixel point, a to-be-displayed pixel attribute of a to-be-displayed pixel point in the target region may be obtained according to the pixel attribute of the to-be-processed pixel point.

In step three, interpolation processing is performed on pixel attributes of to-be-processed pixel points located in the same row or the same column to determine a to-be-displayed pixel attribute of at least one to-be-displayed pixel point in the target region.

The same row may refer to the longitudinal position where to-be-processed pixel points are located in the to-be-processed video frame, and accordingly, the same column may be understood as the horizontal position where to-be-processed pixel points are located in the to-be-processed video frame. The to-be-displayed pixel point may be any pixel point in the target region.

Exemplarily, for the to-be-processed pixel point in the N-th row, the manner of interpolation may be used to process the pixel attribute of the to-be-processed pixel point, and then the pixel attribute corresponding to another to-be-displayed pixel point in the N-th row is obtained and used as the to-be-displayed pixel attribute. It is to be understood that since the target region is a closed region, that is, at least one to-be-processed pixel point exists on the edge line of each row or each column in the region, interpolation processing may be performed on the to-be-processed pixel point of each row or each column where the at least one to-be-processed pixel point is located according to the to-be-processed pixel attribute on the edge line, so as to obtain the to-be-displayed pixel attribute of at least one to-be-displayed pixel point in the target region.

In step four, the target region is displayed based on the to-be-processed pixel attribute and the to-be-displayed pixel attribute to display the translated text in the target region in a superimposition manner.

For example, the target region is displayed according to the to-be-processed pixel attribute and the to-be-displayed pixel attribute, and the translated text is displayed in the target region in the superimposition manner, so as to ensure that the corresponding translated text can be displayed in the target region for the user in a case where the target region does not affect the watching of the video by the user as much as possible.

According to the technical scheme provided in the embodiment of the present disclosure, after the target region is determined, the target region is processed according to the transparency parameter set by the user, or the attribute value of the to-be-displayed pixel in the target region is acquired according to the attribute value of the to-be-processed pixel on the edge line of the target region, and the target region is displayed according to the to-be-processed pixel attribute and the to-be-fused pixel attribute. Multiple display methods of the target region are provided for the user based on the preceding technical scheme, so that the requirements of the user are satisfied, and the user experience is improved.

Figure 9:
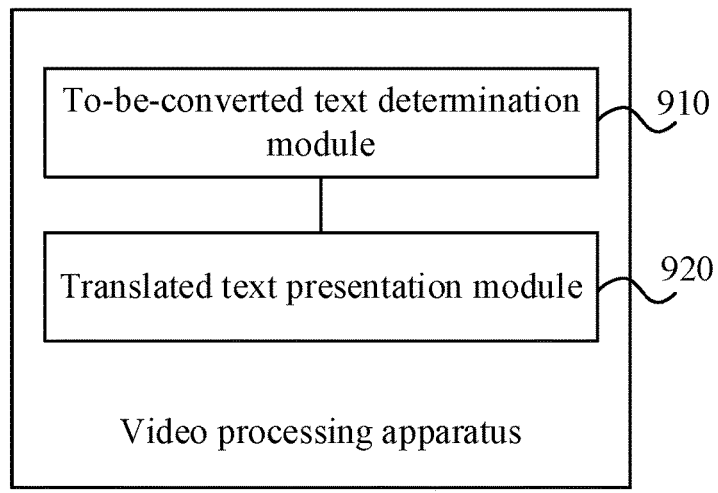
FIG. 9 is a block diagram of a video processing apparatus according to an embodiment of the present disclosure.

FIG. 9 is a block diagram of a video processing apparatus according to an embodiment of the present disclosure. As shown in FIG. 9, the apparatus includes a to-be-converted text determination module 910 and a translated text presentation module 920.

The to-be-converted text determination module 910 is configured to, in a process of playing a target video, determine to-be-converted text in a to-be-processed video frame in response to a triggering operation by a target user on the target video.

The translated text presentation module 920 is configured to convert the to-be-converted text into translated text of a target language type, and present the translated text in a target region in the to-be-processed video frame.

The target region includes a text box region to which converted text content belongs, or the target region is dynamically determined based on a picture content of the to-be-processed video frame.

Based on the preceding technical scheme, the apparatus further includes a target video acquisition module. The target video acquisition module includes a to-be-processed video acquisition unit, a presentation attribute determination unit and a target video determination unit.

The to-be-processed video acquisition unit is configured to obtain a to-be-processed video through shooting in response to a video shooting operation.

The presentation attribute determination unit is configured to determine at least one text box including to-be-displayed text and associated with the to-be-processed video, and present a presentation attribute of the at least one text box.

The target video determination unit is configured to determine the target video based on the to-be-processed video, the at least one text box and the corresponding presentation attribute and publish the target video.

Based on the preceding technical schemes, the presentation attribute determination unit is configured to, in response to detecting triggering a text editing control, display a to-be-edited text box for editing a to-be-played text content in the to-be-edited text box; adjust a display timestamp of the at least one text box in the to-be-processed video based on a triggering operation on a presentation time control to present the to-be-displayed text based on the presentation timestamp in the process of playing the target video; and determine a presentation position of the at least one text box in the corresponding to-be-processed video frame based on a dragging operation on the at least one text box to present the to-be-displayed text based on the presentation position in the process of playing the target video.

Based on the preceding technical schemes, the triggering operation includes at least one of: triggering a text translation control on a display interface; triggering a text box and/or the to-be-converted text in the to-be-processed video frame; detecting that audio information triggers a translation wake-up word; or detecting a long press on the to-be-processed video frame.

Based on the preceding technical schemes, the to-be-converted text determination module is specifically configured to, in response to determining that a to-be-processed video includes a text box based on a presentation attribute associated with the target video, acquire to-be-displayed text in the text box as the to-be-converted text, where the presentation attribute includes a presentation position and a presentation timestamp.

Based on the preceding technical schemes, the to-be-converted text determination module further includes a target language type determination unit.

The target language type determination unit is configured to determine the target language type according to geographical position information of a terminal device to which the target video belongs; pop up at least one to-be-selected language type to in response to the triggering operation, and use a to-be-selected language type triggered and selected as the target language type; determine the target language type according to a language type of a play history within a preset time period; use a preset default language type as the target language type; or use a language type set by a terminal device as the target language type.

Based on the preceding technical schemes, the translated text presentation module further includes a target region determination unit.

The target region determination unit is configured to use a text box to which the to-be-converted text belongs as the target region, and present the translated text in the text box in the to-be-processed video frame; or determine a non-salient region in the to-be-processed video frame, move a text box to which the to-be-converted text belongs into the non-salient region, and use the moved text box as the target region to present the translated text in the non-salient region.

Based on the preceding technical schemes, the translated text presentation module further includes a presentation manner determination unit.

The presentation manner determination unit is configured to present the translated text in the target region in the to-be-processed video frame according to the occupied region area of the translated text and the region area of the target region.

Based on the preceding technical schemes, the presentation manner determination unit is further configured to, in a case where the occupied region area of the translated text is greater than the region area of the target region, process the translated text and/or the target region so that the translated text matches the target region.

Based on the preceding technical schemes, the target region determination unit is further configured to enlarge the region area of the target region according to a preset adjustment rule so that the translated text matches the target region, where the preset adjustment rule includes horizontally enlarging the text box by a first preset size and, in response to the enlarged text box not matching the target region, then longitudinally enlarging the enlarged text box by a second preset size, or longitudinally enlarging the text box by a first preset size and, in response to the enlarged text box not matching the target region, then horizontally enlarging the enlarged text box by a second preset size, or dynamically enlarging the horizontal size of the text box and/or the longitudinal size of the text box based on the non-salient region in the to-be-processed video frame.

Based on the preceding technical schemes, the target region determination unit is further configured to, in a case where the occupied region area of the translated text is less than the region area of the target region, reduce the display size of the text box on the display interface so that the translated text matches the target region for display.

Based on the preceding technical schemes, the apparatus further includes a transparency adjustment module.

The transparency adjustment module is configured to determine, according to a transparency parameter of a text box in the to-be-processed video frame, a display parameter of the target region in a case where the translated text is presented, where the display parameter includes display transparency and a display color.

Based on the preceding technical schemes, the transparency adjustment module is further configured to acquire an edge line of the target region; for at least one processing pixel point on the edge line, acquire at least one to-be-fused pixel point within a preset neighborhood range of a current to-be-processed pixel point, and determine a to-be-processed pixel attribute of the current to-be-processed pixel point according to a pixel attribute of the at least one to-be-fused pixel point; perform interpolation processing on pixel attributes of to-be-processed pixel points located in the same row or the same column to determine a to-be-displayed pixel attribute of at least one to-be-displayed pixel point in the target region; and display the target region based on the to-be-processed pixel attribute and the to-be-displayed pixel attribute to display the translated text in the target region in a superimposition manner.

In the embodiment of the present disclosure, in the process of playing the target video, the to-be-converted text in the to-be-processed video frame is determined in response to the triggering operation by the target user on the target video; and the to-be-converted text is converted into the translated text of the target language type, and the translated text is presented in the target region in the to-be-processed video frame, where the target region includes the text box region to which the converted text content belongs, or the target region is dynamically determined based on the picture content of the to-be-processed video frame. In this manner, the corresponding translated text information is displayed for the user in the process of playing the video based on the triggering operation of the user, so that the user can acquire the corresponding translation information while watching the video; moreover, the translated text information is presented in the corresponding target region, so that the translated information is prevented from affecting the user watching the video, and thus the user experience is improved.

The video processing apparatus provided in the embodiment of the present disclosure may execute the video processing method provided in any embodiment of the present disclosure, and has functional modules for and beneficial effects of executing the method.

It is to be noted that units and modules included in the preceding apparatus are just divided according to functional logic, and the division is not limited to this, as long as the corresponding functions can be implemented. Additionally, the specific names of the functional units are just intended for distinguishing, and are not to limit the protection scope of the embodiments of the present disclosure.

Figure 10:
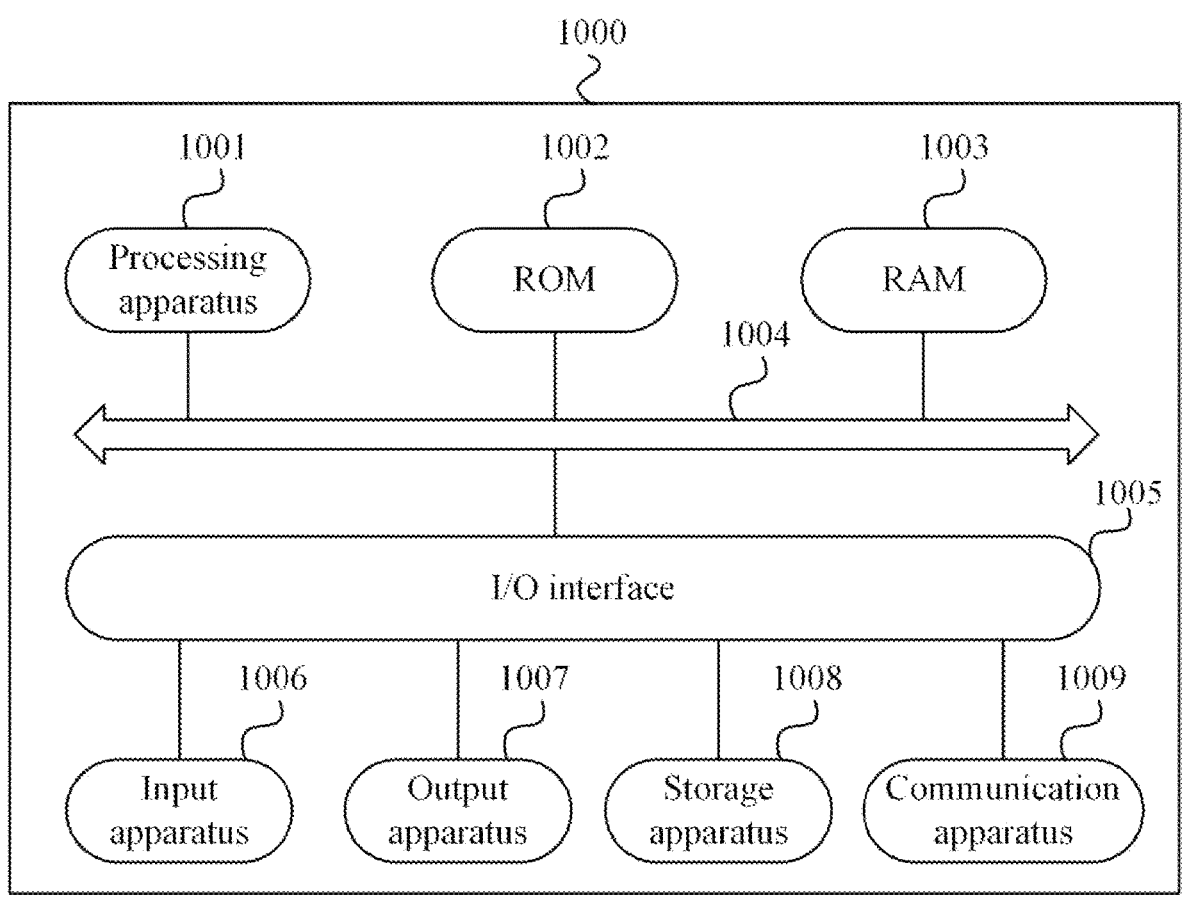
FIG. 10 is a structural diagram of an electronic device according to an embodiment of the present disclosure.

FIG. 10 is a structural diagram of an electronic device according to an embodiment of the present disclosure. Referring to FIG. 10, FIG. 10 shows a structural diagram of an electronic device 1000 (such as the terminal device or server in FIG. 10) applicable to implementing the embodiments of the present disclosure. The terminal device in the embodiment of the present disclosure may include, but is not limited to, mobile terminals such as a mobile phone, a laptop, a digital broadcast receiver, a personal digital assistant (PDA), a tablet personal computer (i.e., a pad), a portable media player (PMP), and an in-vehicle terminal (such as an in-vehicle navigation terminal), and stationary terminals such as a digital television (TV) and a desktop computer. The electronic device shown in FIG. 10 is merely an example and is not intended to limit the function and usage scope of the embodiments of the present disclosure.

As shown in FIG. 10, the electronic device 1000 may include a processing apparatus 1001 (such as a central processing unit and a graphics processing unit). The processing apparatus 1001 may execute various types of appropriate operations and processing based on a program stored in a read-only memory (ROM) 1002 or a program loaded from a storage apparatus 1008 to a random-access memory (RAM) 1003. Various programs and data required for the operation of the electronic device 1000 are also stored in the RAM 1003. The processing apparatus 1001, the ROM 1002 and the RAM 1003 are connected to each other through a bus 1004. An input/output (I/O) interface 1005 is also connected to the bus 1004.

Generally, the following apparatuses may be connected to the I/O interface 1005: an input apparatus 1006 such as a touch screen, a touch pad, a keyboard, a mouse, a camera, a microphone, an accelerometer, and a gyroscope; an output apparatus 1007 such as a liquid crystal display (LCD), a speaker, and a vibrator; the storage apparatus 1008 such as a magnetic tape and a hard disk; and a communication apparatus 1009. The communication apparatus 1009 may allow the electronic device 1000 to perform wireless or wired communication with other devices so as to exchange data. Although FIG. 10 illustrates the electronic device 1000 having various apparatuses, it is to be understood that not all of the apparatuses illustrated herein need to be implemented or present. Alternatively, more or fewer apparatuses may be implemented or present.

Particularly, according to the embodiments of the present disclosure, the process described above with reference to the flowcharts may be implemented as a computer software program. For example, the embodiments of the present disclosure include a computer program product. The computer program product includes a computer program carried in a non-transitory computer-readable medium. The computer program includes program codes for executing the methods shown in the flowcharts. In such an embodiment, the computer program may be downloaded from a network and installed through the communication apparatus 1009, or may be installed from the storage apparatus 1008, or may be installed from the ROM 1002.

When the computer program is executed by the processing apparatus 1001, the preceding functions defined in the methods of the embodiments of the present disclosure are executed.

The names of messages or information exchanged between multiple apparatuses in the embodiments of the present disclosure are only for illustrative purposes and are not intended to limit the scope of such messages or information.

The electronic device provided in the embodiment belongs to the same inventive concept as the video processing methods provided in the preceding embodiments, and for the technical details not described in detail in the embodiment, reference may be made to the preceding embodiments, and the embodiment has the same beneficial effects as the preceding embodiments.

An embodiment of the present disclosure provides a computer storage medium storing a computer program which, when executed by a processor, implements the video processing method provided in the preceding embodiments.

It is to be noted that the preceding computer-readable medium in the present disclosure may be a computer-readable signal medium or a computer-readable storage medium or any combination thereof. The computer-readable storage medium may be, but is not limited to, for example, an electronic, magnetic, optical, electromagnetic, infrared or semiconductor system, apparatus or device, or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or used in conjunction with an instruction execution system, apparatus, or device. The program codes included on the computer-readable medium may be transmitted via any appropriate medium which includes, but is not limited to, a wire, an optical cable, a radio frequency (RF), or any appropriate combination thereof In some embodiments, clients and servers may communicate using any network protocol currently known or to be developed in the future, such as HyperText Transfer Protocol (HTTP), and may be interconnected with any form or medium of digital data communication (such as a communication network). Examples of the communication network include a local area network (LAN), a wide area network (WAN), an internet (such as the Internet), and a peer-to-peer network (such as an Ad-Hoc network), as well as any network currently known or to be developed in the future.

The preceding computer-readable medium may be included in the preceding electronic device or may exist alone without being assembled into the electronic device.

The computer-readable medium carries one or more programs which, when executed by the electronic device, cause the electronic device to implement steps described below.

In a process of playing a target video, to-be-converted text in a to-be-processed video frame is determined in response to a triggering operation by a target user on the target video.

The to-be-converted text is converted into translated text of a target language type, and the translated text is presented in a target region in the to-be-processed video frame.

The target region includes a text box region to which converted text content belongs, or the target region is dynamically determined based on a picture content of the to-be-processed video frame.

Computer program codes for executing the operations in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. The program codes may be executed entirely on a user computer, partly on a user computer, as a stand-alone software package, partly on a user computer and partly on a remote computer, or entirely on a remote computer or a server. In the case related to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show the possible architectures, functions and operations of the system, method and computer program product according to various embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which executes specified functions or operations, or a combination of special-purpose hardware and computer instructions.

The units involved in the embodiments of the present disclosure may be implemented by software or hardware. The names of the units do not constitute a limitation on the units themselves. For example, a first acquisition unit may also be described as "a unit for acquiring at least two Internet protocol addresses".

The functions described above herein may be executed, at least partially, by one or more hardware logic components. For example, without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, a machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any suitable combination thereof.

According to one or more embodiments of the present disclosure, example one provides a video processing method. The method includes steps described below.

In a process of playing a target video, to-be-converted text in a to-be-processed video frame is determined in response to a triggering operation by a target user on the target video.

The to-be-converted text is converted into translated text of a target language type, and the translated text is presented in a target region in the to-be-processed video frame.

The target region includes a text box region to which converted text content belongs, or the target region is dynamically determined based on a picture content of the to-be-processed video frame.

According to one or more embodiments of the present disclosure, example two provides a video processing method. The method further includes steps described below.

A to-be-processed video is obtained through shooting in response to a video shooting operation.

At least one text box including to-be-displayed text and associated with the to-be-processed video is determined, and a presentation attribute of the at least one text box is presented.

The target video is determined based on the to-be-processed video, the at least one text box and the corresponding presentation attribute and is published. According to one or more embodiments of the present disclosure, example three provides a video processing method. The method further includes steps described below.

In response to detecting triggering a text editing control, a to-be-edited text box is displayed for editing a to-be-played text content in the to-be-edited text box.

A display timestamp of the at least one text box in the to-be-processed video is adjusted based on a triggering operation on a presentation time control to present the to-be-displayed text based on the presentation timestamp in the process of playing the target video.

A presentation position of the at least one text box in the corresponding to-be-processed video frame is determined based on a dragging operation on the at least one text box to present the to-be-displayed text based on the presentation position in the process of playing the target video.

According to one or more embodiments of the present disclosure, example four provides a video processing method. The method further involves that the triggering operation includes at least one of operations described below.

A text translation control on a display interface is triggered.

A text box and/or the to-be-converted text in the to-be-processed video frame are triggered.

It is detected that audio information triggering a translation wake-up word.

A long press on the to-be-processed video frame is detected.

According to one or more embodiments of the present disclosure, example five provides a video processing method. The method further includes the step described below.

In response to determining that a to-be-processed video includes a text box based on a presentation attribute associated with the target video, to-be-displayed text in the text box is acquired as the to-be-converted text.

The presentation attribute includes a presentation position and a presentation timestamp.

According to one or more embodiments of the present disclosure, example six provides a video processing method. The method further includes steps described below.

The target language type is determined according to geographical position information of a terminal device to which the target video belongs.

At least one to-be-selected language type pops up in response to the triggering operation, and a to-be-selected language type triggered and selected is used as the target language type.

The target language type is determined according to a language type of a play history within a preset time period.

A preset default language type is used as the target language type.

A language type set by a terminal device is used as the target language type.

According to one or more embodiments of the present disclosure, example seven provides a video processing method. The method further includes steps described below.

A text box to which the to-be-converted text belongs is used as the target region, and the translated text is presented in the text box in the to-be-processed video frame.

A non-salient region in the to-be-processed video frame is determined, a text box to which the to-be-converted text belongs is moved into the non-salient region, and the moved text box is used as the target region to present the translated text in the non-salient region.

According to one or more embodiments of the present disclosure, example eight provides a video processing method. The method further includes the step described below.

The translated text is presented in the target region in the to-be-processed video frame according to the font size corresponding to the to-be-converted text or a default font size.

According to one or more embodiments of the present disclosure, example nine provides a video processing method. The method further includes the step described below.

The translated text and/or the target region are processed according to the occupied region area of the translated text and the region area of the target region so that the translated text matches the target region.

According to one or more embodiments of the present disclosure, example ten provides a video processing method. The method further includes the step described below.

In a case where the occupied region area of the translated text is greater than the region area of the target region, the font size of the translated text is sequentially adjusted under a condition that the region area of the target region does not change so that the translated text matches the target region.

According to one or more embodiments of the present disclosure, example eleven provides a video processing method. The method further includes the step described below.

The region area of the target region is enlarged according to a preset adjustment rule so that the translated text matches the target region.

The preset adjustment rule includes horizontally enlarging the text box by a first preset size and, in response to the enlarged text box not matching the target region, then longitudinally enlarging the enlarged text box by a second preset size, or longitudinally enlarging the text box by a first preset size and, in response to the enlarged text box not matching the target region, then horizontally enlarging the enlarged text box by a second preset size, or dynamically enlarging the horizontal size of the text box and/or the longitudinal size of the text box based on the non-salient region in the to-be-processed video frame.

According to one or more embodiments of the present disclosure, example twelve provides a video processing method. The method further includes the step described below.

In a case where the occupied region area of the translated text is less than the region area of the target region, the display size of the text box on the display interface is reduced so that the translated text matches the target region for display.

According to one or more embodiments of the present disclosure, example thirteen provides a video processing method. The method further includes the step described below.

A display parameter of the target region is determined according to a transparency parameter of a text box in the to-be-processed video frame in a case where the translated text is presented.

The display parameter includes display transparency and a display color.

According to one or more embodiments of the present disclosure, example fourteen provides a video processing method. The method further includes steps described below.

An edge line of the target region is acquired.

For at least one processing pixel point on the edge line, at least one to-be-fused pixel point within a preset neighborhood range of a current to-be-processed pixel point is acquired, and a to-be-processed pixel attribute of the current to-be-processed pixel point is determined according to a pixel attribute of the at least one to-be-fused pixel point.

Interpolation processing is performed on pixel attributes of to-be-processed pixel points located in the same row or the same column to determine a to-be-displayed pixel attribute of at least one to-be-displayed pixel point in the target region.

The target region is displayed based on the to-be-processed pixel attribute and the to-be-displayed pixel attribute to display the translated text in the target region in a superimposition manner.

According to one or more embodiments of the present disclosure, example fifteen provides a video processing apparatus. The apparatus includes a to-be-converted text determination module and a translated text presentation module.

The to-be-converted text determination module is configured to, in a process of playing a target video, determine to-be-converted text in a to-be-processed video frame in response to a triggering operation by a target user on the target video.

The translated text presentation module is configured to convert the to-be-converted text into translated text of a target language type, and present the translated text in a target region in the to-be-processed video frame.

The target region includes a text box region to which converted text content belongs, or the target region is dynamically determined based on a picture content of the to-be-processed video frame.

The preceding description is merely illustrative of preferred embodiments of the present disclosure and the technical principles used therein. Those of ordinary skill in the art should understand that the scope referred to in the disclosure is not limited to the technical schemes formed by the particular combination of the preceding technical features, but intended to cover other technical schemes which may be formed by any combination of the preceding technical features or their equivalents without departing from the concept of the disclosure, for example, technical schemes formed by mutual substitutions of the preceding features and the technical features disclosed in the present disclosure (but not limited to) that have similar functions.

In addition, although the operations are depicted in a particular order, this should not be construed as requiring that such operations should be performed in the particular order shown or in a sequential order. In certain circumstances, multitasking and parallel processing may be advantageous. Similarly, although specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually, or in any suitable sub-combination.

Although the subject matter is described in the language specific to structural features and/or methodological logic acts, it is to be understood that the subject matter defined in the appended claims is not necessarily limited to the specific features or acts described above. Conversely, the specific features and acts described above are merely example forms of implementing the claims.

What is claimed is:

1. A video processing method, comprising:
   in a process of playing a target video, determining to-be-converted text in a to-be-processed video frame in response to a triggering operation by a target user on the target video; and
   converting the to-be-converted text into translated text of a target language type, and presenting the translated text in a target region in the to-be-processed video frame;
   wherein the target region comprises a text box region to which the to-be-converted text belongs, or the target region is dynamically determined based on a picture content of the to-be-processed video frame;
   wherein the method further comprises:
   obtaining a to-be-processed video through shooting in response to a video shooting operation;
   determining at least one text box comprising to-be-displayed text and associated with the to-be-processed video, and presenting a presentation attribute of the at least one text box; and
   determining the target video based on the to-be-processed video, the at least one text box and the corresponding presentation attribute and publishing the target video; and
   wherein the presentation attribute comprises a presentation timestamp and a presentation position, and determining the at least one text box comprising the to-be-displayed text and associated with the to-be-processed video, and presenting the presentation attribute of the at least one text box comprises:
   in response to detecting triggering a text editing control, displaying a to-be-edited text box for editing a to-be-played text content in the to-be-edited text box;
   adjusting a display timestamp of the at least one text box in the to-be-processed video based on a triggering operation on a presentation time control to present the to-be-displayed text based on the presentation timestamp in the process of playing the target video; and
   determining the presentation position of the at least one text box in the corresponding to-be-processed video frame based on a dragging operation on the at least one text box to present the to-be-displayed text based on the presentation position in the process of playing the target video.

2. The method according to claim 1, wherein determining the to-be-converted text in the to-be-processed video frame comprises:
   in response to determining that the to-be-processed video frame comprises a text box based on a presentation attribute associated with the target video, acquiring to-be-displayed text in the text box as the to-be-converted text, wherein
   the presentation attribute associated with the target video comprises a presentation position and a presentation timestamp.

3. The method according to claim 1, wherein the target language type is determined in at least one of following manners:
   determining the target language type according to geographical position information of a terminal device to which the target video belongs;
   popping up at least one to-be-selected language type in response to the triggering operation, and using a to-be-selected language type selected as the target language type;
   determining the target language type according to a language type of a play history within a preset time period;
   using a preset default language type as the target language type; or using a language type set by a terminal device as the target language type.

4. The method according to claim 1, wherein presenting the translated text in the target region in the to-be-processed video frame comprises:
   using a text box to which the to-be-converted text belongs as the target region, and presenting the translated text in the text box in the to-be-processed video frame; or determining a non-salient region in the to-be-processed video frame, moving a text box to which the to-be-converted text belongs into the non-salient region, and using the moved text box as the target region to present the translated text in the non-salient region.

5. The method according to claim 4, wherein presenting the translated text in the target region in the to-be-processed video frame comprises:
presenting the translated text in the target region in the to-be-processed video frame according to a font size corresponding to the to-be-converted text or a default font size.

6. The method according to claim 1, wherein presenting the translated text in the target region in the to-be-processed video frame comprises:
presenting the translated text in the target region in the to-be-processed video frame according to a font size corresponding to the to-be-converted text or a default font size.

7. The method according to claim 6, wherein presenting the translated text in the target region in the to-be-processed video frame comprises:
processing at least one of the translated text or the target region according to an occupied region area of the translated text and a region area of the target region so that the translated text matches the target region.

8. The method according to claim 7, wherein processing the translated text so that the translated text matches the target region comprises:
in a case where the occupied region area of the translated text is greater than the region area of the target region, adjusting a font size of the translated text under a condition that the region area of the target region does not change so that the translated text matches the target region.

9. The method according to claim 8, wherein processing the target region so that the translated text matches the target region comprises:
enlarging the region area of the target region according to a preset adjustment rule so that the translated text matches the target region, wherein
the preset adjustment rule comprises horizontally enlarging the text box by a first preset size and, in response to the enlarged text box not matching the target region, then longitudinally enlarging the enlarged text box by a second preset size; or longitudinally enlarging the text box by a first preset size and, in response to the enlarged text box not matching the target region, then horizontally enlarging the enlarged text box by a second preset size; or dynamically enlarging at least one of a horizontal size of the text box or a longitudinal size of the text box based on the non-salient region in the to-be-processed video frame.

10. The method according to claim 7, wherein processing the target region so that the translated text matches the target region comprises:
enlarging the region area of the target region according to a preset adjustment rule so that the translated text matches the target region, wherein
the preset adjustment rule comprises horizontally enlarging a text box to which the to-be-converted text belongs by a first preset size and, in response to the enlarged text box not matching the target region, then longitudinally enlarging the enlarged text box by a second preset size; or longitudinally enlarging the text box by a first preset size and, in response to the enlarged text box not matching the target region, then horizontally enlarging the enlarged text box by a second preset size; or dynamically enlarging at least one of a horizontal size of the text box or a longitudinal size of the text box based on a non-salient region in the to-be-processed video frame.

11. The method according to claim 6, wherein presenting the translated text in the target region in the to-be-processed video frame comprises:
in a case where the occupied region area of the translated text is less than the region area of the target region, reducing a display size of the text box on the display interface so that the translated text matches the target region for display.

12. The method according to claim 1, further comprising:
determining, according to a transparency parameter of a text box in the to-be-processed video frame, a display parameter of the target region in a case where the translated text is presented, wherein
the display parameter comprises display transparency and a display color.

13. The method according to claim 1, further comprising:
acquiring an edge line of the target region;
for at least one to-be-processed pixel point on the edge line, acquiring at least one to-be- fused pixel point within a preset neighborhood range of a current to-be-processed pixel point, and determining a to-be-processed pixel attribute of the current to-be-processed pixel point according to a pixel attribute of the at least one to-be-fused pixel point;
performing interpolation processing on pixel attributes of to-be-processed pixel points located in a same row or a same column to determine a to-be-displayed pixel attribute of at least one to-be-displayed pixel point in the target region; and
displaying the target region based on the to-be-processed pixel attribute and the to-be-displayed pixel attribute to display the translated text in the target region in a superimposition manner.

14. The method according to claim 1, wherein the triggering operation comprises at least one of:
triggering a text translation control on a display interface;
triggering at least one of a text box or the to-be-converted text in the to-be-processed video frame;
detecting that audio information triggers a translation wake-up word; or
detecting a long press on the to-be-processed video frame.

15. An electronic device, comprising:
one or more processors; and
a storage apparatus configured to store one or more programs;
wherein the one or more programs, when executed by the one or more processors, cause the one or more processors to implement the following steps:
in a process of playing a target video, determining to-be-converted text in a to-be-processed video frame in response to a triggering operation by a target user on the target video; and
converting the to-be-converted text into translated text of a target language type, and presenting the translated text in a target region in the to-be-processed video frame;
wherein the target region comprises a text box region to which the to-be-converted text belongs, or the target region is dynamically determined based on a picture content of the to-be-processed video frame;

wherein the one or more programs, when executed by the one or more processors, further cause the one or more processors to implement the following steps:

obtaining a to-be-processed video through shooting in response to a video shooting operation;

determining at least one text box comprising to-be-displayed text and associated with the to-be-processed video, and presenting a presentation attribute of the at least one text box, and determining the target video based on the to-be-processed video, the at least one text box and the corresponding presentation attribute and publishing the target video; and wherein the presentation attribute of the at least one text box comprises a presentation timestamp and a presentation position, and determining the at least one text box comprising the to-be-displayed text and associated with the to-be-processed video, and presenting the presentation attribute of the at least one text box comprises:

in response to detecting triggering a text editing control, displaying a to-be-edited text box for editing a to-be-played text content in the to-be-edited text box;

adjusting a display timestamp of the at least one text box in the to-be-processed video based on a triggering operation on a presentation time control to present the to-be-displayed text based on the presentation timestamp in the process of playing the target video; and determining the presentation position of the at least one text box in the corresponding to- be-processed video frame based on a dragging operation on the at least one text box to present the to-be-displayed text based on the presentation position in the process of playing the target video.

16. A non-transitory storage medium comprising computer-executable instructions which, when executed by a computer processor, are configured to implement the following steps:

in a process of playing a target video, determining to-be-converted text in a to-be-processed video frame in response to a triggering operation by a target user on the target video; and converting the to-be-converted text into translated text of a target language type, and presenting the translated text in a target region in the to-be-processed video frame;

wherein the target region comprises a text box region to which the to-be-converted text belongs, or the target region is dynamically determined based on a picture content of the to-be-processed video frame;

wherein the instructions, when executed by the computer processor, further cause the computer processor to implement the following steps:

obtaining a to-be-processed video through shooting in response to a video shooting operation;

determining at least one text box comprising to-be-displayed text and associated with the to-be-processed video, and presenting a presentation attribute of the at least one text box; and determining the target video based on the to-be-processed video, the at least one text box and the corresponding presentation attribute and publishing the target video; and wherein the presentation attribute of the at least one text box comprises a presentation timestamp and a presentation position, and determining the at least one text box comprising the to-be-displayed text and associated with the to-be-processed video, and presenting the presentation attribute of the at least one text box comprises:

in response to detecting triggering a text editing control, displaying a to-be-edited text box for editing a to-be-played text content in the to-be-edited text box;

adjusting a display timestamp of the at least one text box in the to-be-processed video based on a triggering operation on a presentation time control to present the to-be-displayed text based on the presentation timestamp in the process of playing the target video; and determining the presentation position of the at least one text box in the corresponding to-be-processed video frame based on a dragging operation on the at least one text box to present the to-be-displayed text based on the presentation position in the process of playing the target video.

* * * * *